June 12, 1945.  W. B. WIEGAND ET AL  2,378,055

MANUFACTURE OF CARBON BLACK

Original Filed June 27, 1942

INVENTORS
William B. Wiegand
Harold A. Braendle
BY
Pennie, Davis, Marvin & Edmonds
ATTORNEYS Patented June 12, 1945

2,378,055

UNITED STATES PATENT OFFICE 2,378,055

MANUFACTURE OF CARBON BLACK

William Bryan Wiegand, Old Greenwich, Conn., and Harold A. Braendle, Garden City, N. Y., assignors to Columbian Carbon Company, New York, N. Y., a corporation of Delaware Original application June 27, 1942, Serial No. 448,806. Divided and this application May 27, 1943, Serial No. 488,700

5 Claims. (Cl. 23—209.4)

This invention relates to carbon black and more particularly to an improved process whereby carbon black embodying a novel combination of characteristics, including optimum fineness of sub-division and a high degree of purity, may be produced.

This application is a division of our co-pending application Serial No. 448,806, filed June 27, 1942, as a continuation of our application Serial No. 349,908, filed August 2, 1940.

By reason of its unique combination of properties, more fully set forth in the earlier filed applications, the carbon black product of the process of our present invention is especially valuable as a compounding agent in rubber compositions and as a pigment in the manufacture of ink or the like.

In general, the process comprises forcefully injecting into a confined, violently turbulent blast flame a stream or streams of natural gas or the like, herein referred to as "make gas," in such a way as to effect as nearly as possible instantaneous and complete mixing of the make gas with the flame gases. The admixture of flame gases and make gas is then caused to continue on through an elongated, confined passage at a high temperature and at high velocity and turbulence. The make gas is thus decomposed by heat absorbed directly from the flame gases and the carbon black thus formed is carried along through and out of the decomposing zone by the high velocity gaseous stream, cooled to a suitable collection temperature and recovered in any customary manner.

For a more detailed description of the process, reference will be made to the accompanying drawing which represents conventionally and somewhat diagrammatically one form of apparatus suitable for carrying out the process.

Figure 1:
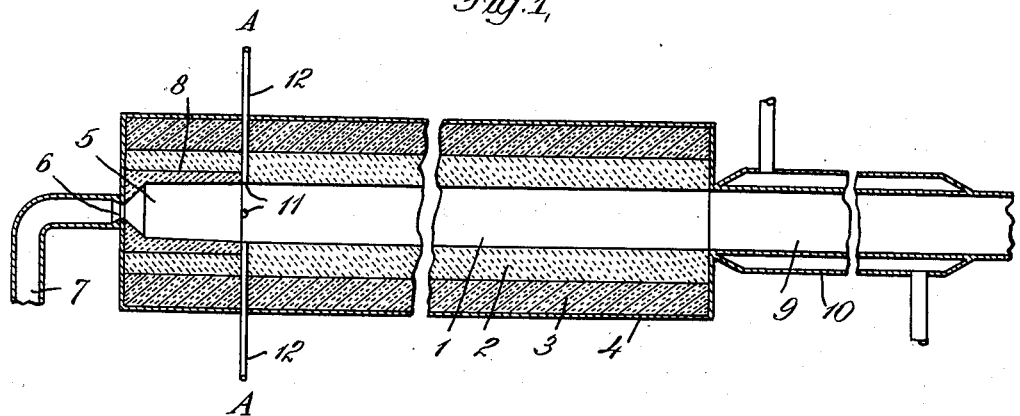
Figure 2:
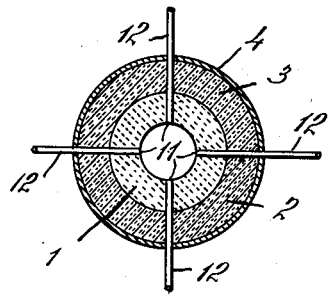

Figure 1 of the drawing is a longitudinal, sectional view of the apparatus, and Figure 2 is a cross-sectional view of the apparatus along the lines A—A.

The apparatus consists of an elongated cylindrical retort 1 lined with firebrick 2. Surrounding the layer of firebrick is an outer layer of insulation brick 3 all enclosed in a sheet steel cylindrical casing 4. At one end of this cylindrical retort there is provided a combustion chamber 5 communicating through the orifice 6 with the conduit 7 through which an air-gas mixture is blasted into the combustion chamber by means of a blower or the like, not shown. The combustion chamber is lined with high temperature refractory 8.

The air-gas mixture is introduced at high velocity into the combustion chamber wherein combustion is initiated and the flame gases pass to the right through the retort, leaving the same through the conduit 9. In the drawing the conduit 9 is conventionally shown as surrounded by a water jacket 10 for cooling the gases and suspended carbon black particles passing therethrough.

Just to the right of the combustion chamber the retort is provided with a plurality of ports 11 connected to a convenient supply of natural gas or the like, not shown in the drawing, by means of conduits 12.

In carrying out the process a blast of hydrocarbon gases, having admixed therewith sufficient air for combustion, is supplied under pressure and at a high velocity to the chamber 5. This air-gas mixture is ignited in chamber 5 and continues at a high velocity and in a violently turbulent condition through the retort.

The gas to be decomposed, for instance natural gas or the like, is injected also at high velocity, into the turbulent stream of flame gases at right angles thereto through the conduits 12 and ports 11. In the particular apparatus herein illustrated, means are shown for the introduction of four independent streams of make gas, but a greater or less number may be used if desired.

The make gas thus injected into the hot flame gases is substantially instantaneously thoroughly mixed with the latter and becomes highly heated thereby.

The proportion of air in the air-gas mixture supplied to the combustion chamber is advantageously just sufficient for substantially complete combustion of the fuel gas. However, the ratio of air to gas may be varied somewhat in either direction. The combustion of the fuel gas, initiated in chamber 5, continues through the retort to a greater or less extent depending upon operating conditions, and the make gas injected into the retort through the ports 11 is decomposed in its passage through said retort in intimate admixture with the highly heated gases.

Leaving the far end of the retort, the effluent gases, with the carbon particles suspended therein, pass through a cooler, which may be of any conventional type, but which is diagrammatically shown in the drawing as a water-jacketed conduit, wherein they are cooled to a suitable collection temperature. From the cooler the gases carrying the suspended carbon black pass to a bag-type filter or other conventional separating means whereby the carbon black is collected and from which it is passed to suitable storage.

The size and relative dimensions of the apparatus described above may be varied in accordance with the desired capacity. Satisfactory operation on a semi-commercial scale has been obtained in apparatus such as described above in which the retort was 7" inside diameter and 16' long. The overall length of the chamber 5 was 13.5". The blast line 7 was 4" in diameter and the apparatus was provided with four ports, connected with separate make gas conduits, each ¼" in diameter. The cooling device used with this apparatus was substantially as shown in the drawing, consisting of a conduit 7" inside diameter surrounded by a water jacket extending along the conduit for a distance of 10 feet through which cooling water was continuously passed, supplemented by an additional length of unjacketed pipe for further cooling by radiation. In this apparatus the firebrick lining of the retort was 4½" thick and the layer of insulating brick surrounding the firebrick lining was likewise 4½" thick.

In carrying out the process in this apparatus, for example, a blast of air-gas mixture consisting of 10 parts of air to 1 part of natural gas (by volume) was supplied to the combustion chamber at a rate of 8800 cubic feet per hour. The air and gas were mixed prior to introduction into the combustion chamber and were supplied thereto from the conduit 7 under superatmospheric pressure equivalent to 16" of water. Make gas, which was natural gas and consisted essentially of methane, was fed into the retort through four ¼" ports, as shown in the drawing, at the rate of 1000 cubic feet per hour. In this operation the retort temperature, at a point 2 feet down stream from the point of injection of the make gas, was 2300° F., as measured on a carborundum target tube by a Leeds and Northrup optical pyrometer, and the temperature of the gases leaving the retort was 2025° F., similarly measured. The temperature of the effluent gases carrying the carbon black in suspension was reduced to approximately 1400° F., as measured by a Chromel-Chromel-Alumel thermocouple, in passing through the water-jacketed portion of the cooler. The carbon black particles were subsequently cooled to below 600° F., and collected in a bag-type filter.

In addition to optimum fineness of sub-division and a high degree of purity, the carbon black product resulting from the process of our present invention is characterized by optimum tinting strength, a non-acidic reaction, good workability or ease and economy of processing in the compounding of rubber, ink or the like and its ability to impart a unique combination of properties to rubber compounds in which it is incorporated.

Briefly, as a rubber compounding ingredient, the carbon black product of this process possesses the desirable properties of (a) easy processing, (b) non-interference with vulcanization and of imparting to rubber compounds in which it is used (c) full reinforcement, (d) low hysteresis, (e) good electrical conductivity and (f) good aging properties. Also, in an ink medium or the like, the carbon black product is characterized by easy mixing, maximum covering power and a blue undertone, as compared with previous commercial color blacks.

The individual characteristics of the carbon black product of the process of our present invention may be varied somewhat (a) by varying the relative amounts of air and gas in the blast mixture; (b) by varying the relative amounts of make and blast gases; (c) by varying somewhat the temperature and temperature gradient in the retort; (d) by varying the time at which the carbon black particles are in contact with the gases at high reactive temperature; (e) by varying the operating load on a particular size furnace; or (f) by the introduction of additional air, oxygen, steam or other oxidizing agent.

We claim:

1. The process of producing carbon black by thermally decomposing hydrocarbons which comprises burning a mixture of a combustible gas and an oxygen containing gas in substantially the proportions required for complete combustion so as to produce a hot turbulent inert gas mixture having a temperature sufficiently high to thermally decompose hydrocarbons, passing said mixture through an elongated uncooled and unobstructed reaction chamber, injecting into said gas mixture while passing through said reaction chamber in a direction substantially at right angles to its direction of flow hydrocarbon gases which decompose with absorption of heat in such quantity that a hot mixture of inert gases and hydrocarbon gases is produced at a temperature at which the hydrocarbon gases are largely decomposed to form finely divided carbon and in such quantity that the hot mixture of gases and products of decomposition of the hydrocarbon gases is cooled to about 1100° C. in a relatively short time and before the mixture leaves the reaction chamber substantially solely by the heat absorbed in the decomposition of the hydrocarbon gases, passing the mixture of gases and carbon from the reaction chamber and collecting the carbon.

2. The process for producing carbon black by thermally decomposing hydrocarbons which comprises burning a mixture of a combustible gas and an oxygen containing gas in substantially the proportions required for complete combustion so as to produce a hot turbulent gas mixture having a temperature sufficiently high to thermally decompose hydrocarbons, passing said mixture through an elongated, uncooled and unobstructed reaction chamber, injecting into and rapidly and thoroughly intermixing with said gas mixture while passing through said reaction chamber, hydrocarbon gases which decompose with absorption of heat in such quantity that a hot mixture of said gas mixture and hydrocarbon gases is produced at a temperature at which the hydrocarbon gases are largely decomposed to form finely divided carbons and in such quantity that the hot mixture of gases and products of decomposition of the hydrocarbon gases is cooled to about 1100° C. in a relatively short time and before the mixture leaves the reaction chamber substantially solely by the heat absorbed in the decomposition of the hydrocarbon gases, passing the mixture of gases and carbon from the reaction chamber and collecting the carbon.

3. In the process of producing carbon black by thermally decomposing hydrocarbons which comprises introducing into one end of an elongated, uncooled and unobstructed reaction chamber, a hot turbulent gas mixture having a temperature sufficiently high to thermally decompose hydrocarbons and passing said gas mixture through said reaction chamber, injecting into and rapidly and thoroughly intermixing with said gas mixture while passing through said reaction chamber hydrocarbon gases which decompose with absorption of heat in such quantity that a hot mixture of said gas mixture and hydrocarbon gases is produced at a temperature at which the hydrocarbon gases are largely decomposed to form finely divided carbon and in such quantity that the hot mixture of gases and products of decomposition of the hydrocarbon gases is cooled to about 1100° C. in a relatively short time and before the mixture leaves the reaction chamber substantially solely by the heat absorbed in the decomposition of the hydrocarbon gases, passing the mixture of gases and carbon from the reaction chamber and collecting the carbon.

4. The process of producing carbon black by thermally decomposing hydrocarbons which comprises the injecting into and burning within an elongated, uncooled and unobstructed reaction chamber, of substantially uniform and relatively small cross-sectional area, a mixture of a combustible gas and an oxygen-containing gas at such a rate as to produce a violently turbulent flow of gas and blast flame, having a temperature sufficiently high to thermally decompose hydrocarbons, forcefully injecting into said blast flame while passing through said reaction chamber, and at a point removed from the point of introduction of said gas mixture, hydrocarbon gases to be decomposed in such quantity that a hot mixture of the flame gases and the hydrocarbon gases is produced at a temperature at which the hydrocarbon gases are largely decomposed to form finely-divided carbon, effecting thereby substantially instantaneous and complete mixing of the hydrocarbon gases with the flame gases, continuing the flow of the gas mixture through the elongated reaction chamber at high temperature and high turbulence, whereby the hydrocarbon gases are decomposed by the heat of the flame gases within the reaction chamber and during the period of maintained turbulence, passing the mixture of gases and carbon from the reaction chamber, and collecting the carbon.

5. The process of producing carbon black by thermally decomposing hydrocarbons which comprises introducing into one end of an elongated, uncooled and unobstructed reaction chamber, of substantially uniform and relatively small cross-sectional area, a hot gas having a temperature sufficiently high to thermally decompose hydrocarbons and at such a rate as to produce a violently turbulent flow of said hot gases through said chamber, forcefully injecting into said hot turbulent flow of gases while passing through said reaction chamber, at a point removed from the point of introduction of said hot gas, hydrocarbon gas to be decomposed in such quantity that a hot mixture of said hot gases and the hydrocarbon gases is produced at a temperature at which the hydrocarbon gases are largely decomposed to form finely-divided carbon, effecting thereby substantially instantaneous and complete mixing of the hydrocarbon gases with the said hot turbulent gas mixture, continuing the flow of the resultant gas mixture through the elongated reaction chamber at high temperature and high turbulence, whereby the hydrocarbon gases are decomposed by the heat of the first said gas mixture within the reaction chamber and during the period of maintained turbulence, passing the mixture of gases and carbon from the reaction chamber, and collecting the carbon.

WILLIAM BRYAN WIEGAND.
HAROLD A. BRAENDLE.